Patented Oct. 17, 1939

2,176,417

UNITED STATES PATENT OFFICE 2,176,417

PREPARATION OF PENTACHLOROPHENOL

Edgar C. Britton and Francis N. Alquist, Midland, Mich., assignors to The Dow Chemical Company, Midland, Mich., a corporation of Michigan No Drawing. Application October 19, 1938, Serial No. 235,887

8 Claims. (Cl. 260—623)

This invention concerns an improved method for preparing pentachlorophenol, a valuable germicide and fungicide.

Pentachlorophenol has been prepared by the direct chlorination of phenol, hydrolysis of heachlorobenzene, and by the reduction of hexachlorophenol. Hexachlorophenol has been reduced with mixtures comprising metallic zinc, zinc chloride, stannous chloride, and the like, in water and alcohol, and in the presence of various acids and bases. These reduction methods employ expensive reagents and frequently require the utilization of high temperatures and pressures to accomplish reaction. A further disadvantage of the above methods is the nature of the product obtained, such product generally being contaminated with lower polychlorophenols and quinoidal and tarry decomposition products. Pentachlorophenol is difficultly separable from such mixtures, which results in low yields and high costs for a product of the purity required for general bactericidal and fungicidal application.

It is an object of the present invention to provide a process for the reduction of hexachlorophenol to pentachlorophenol which (1) makes use of an inexpensive and readily available industrial by-product as the active reducing agent, (2) results in high yields of pentachlorophenol to the practical exclusion of lower polychlorophenols and tarry decomposition products, (3) yields pentachlorophenol of such purity as to be useful as a fungicidal product without being subjected to involved purification treatments, and (4) does not employ high temperatures and pressures.

We have discovered that aqueous alcoholic dispersions of hexachlorophenol are reduced by sulfur dioxide to give a substantially quantitative yield of pentachlorophenol. In our new process, sulfur dioxide removes a single chlorine atom from the ring to form pentachlorophenol without at the same time producing tetra- and trichlorophenals by the removal of a plurality of the chlorine atoms as do most known reducing agents. While pure sulfur dioxide may be employed in the process, a comparatively crude product, such as obtained in the tail gases from various industrial operations or from a sulfur burner, is satisfactory.

The lower aliphatic alcohols, such as methyl alcohol, ethyl alcohol, ethylene glycol, etc., are particularly well adapted for use in the above process. These compounds are all miscible with water, act as solvents for the pentachlorophenol as formed, are readily recoverable from the reaction mixture, and have the added advantage of forming water mixtures, the reflux temperatures of which fall within the preferred range of reaction temperatures.

In carrying out the reaction, the hexachlorophenol is suspended or otherwise dispersed in an excess of a lower aliphatic alcohol containing from 5 to 50 per cent by volume of water. This mixture is warmed to a temperature between about 50° and 100° C. and gaseous sulfur dioxide passed therethrough with agitation. While somewhat higher or lower temperatures than shown above may be employed if desired, it has been found preferable to carry out the reaction at the reflux temperature of the mixture. Addition of the sulfur dioxide is continued until an appreciable molecular excess has been contacted with the reaction mixture and inspection of an aliquot portion of the mixture shows a substantially complete reduction of the hexachlorophenol. Following completion of the reaction, the mixture is cooled, blown with air to remove residual unreacted sulfur dioxide, and filtered to remove any alcohol-insoluble impurities initially present in the hexachlorophenol. The filtrate is then diluted with water and the alcohol recovered, if desired, by fractional distillation. The distillation residue, consisting of an aqueous slurry of crystals, is then filtered to separate the pentachlorophenol, which is washed with water and dried. If the recovery of alcohol from the reaction mixture is not required, from 5 to 6 volumes of water may be added thereto, whereby the pentachlorophenol is substantially completely precipitated from solution. This crude product is in the form of white to cream-colored crystals substantially free of lower chlorinated polychlorophenols and quinoidal and tarry by-products of reaction. The melting point of the dried product is generally between about 180° and 190° C. without any further purification, the yields thereof varying between approximately 94 and 99 per cent of theoretical.

Hexachlorophenol, or hexachloro-cyclohexadiene-1,4-one-3, is a yellow crystalline material having the formula:

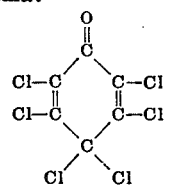

and melting at 106°–107° C. This compound may be readily prepared by the direct chlorination of phenol in the presence of a catalytic amount of antimony trichloride. It is not appreciably soluble in alcohol.

The following examples set forth certain embodiments of our invention, but are not to be construed as limiting the same:

Example 1

37 grams (0.125 mol) of hexachlorophenol was dispersed in 200 milliliters of 95 per cent ethyl alcohol. This mixture was warmed to its refluxing temperature of approximately 80° C. and gaseous sulfur dioxide passed into and through the reaction mixture at that temperature. At the end of eight hours, examination of an aliquot portion of the reaction mixture indicated the complete reduction of the hexachlorophenol. The reaction solution was then filtered to remove traces of alcohol-insoluble materials initially present in the hexachlorophenol and the filtrate diluted with approximately 5 volumes of distilled water, which resulted in a precipitation of the crude phenol products. The aqueous slurry so obtained was filtered and the residue dried, whereby there was obtained 32 grams (1.21 mol) of crude pentachlorophenol as a white, crystalline product melting at 187.5° C. This is a yield of 96.8 per cent of theoretical.

Example 2

In a similar manner, 120 pounds of hexachlorophenol (melting point 105°–106° C.) was suspended in 180 pounds of 95 per cent ethyl alcohol, and 53 pounds of gaseous sulfur dioxide passed through the dispersion at temperatures gradually increasing from 50° to 80° C., the reflux temperature of the mixture. Thirty hours were required for the introduction of the sulfur dioxide, at the end of which time the reaction mixture was blown for 2 hours with air to remove unreacted sulfur dioxide. The blown reaction mixture was filtered to remove 0.7 pound of alcohol-insoluble impurities initially present in the hexachlorophenol, and the 281 pounds of filtrate diluted with 240 pounds of water. The diluted mixture was fractionally distilled to recover better than 90 per cent by weight of the alcohol initially employed. The residue from the distillation, consisting of a water slurry of pentachlorophenol crystals, was filtered, washed with water, and the filter-cake dried, whereby there was obtained 100 pounds of crude pentachlorophenol as a white, crystalline product of such purity as to be adapted for general fungicidal application.

Example 3

37 grams (0.125 mol) of hexachlorophenol was suspended in a mixture of 100 milliliters of absolute alcohol and 100 milliliters of distilled water and reacted with an excess of gaseous sulfur dioxide substantially as described in Example 1. The reaction was carried out at the reflux temperature of the mixture and over a period of approximately seven hours. A high yield of crude pentachlorophenol was thereby obtained as a white, crystalline material melting at 187° C.

Example 4

37 grams (0.125 mol) of hexachlorophenol was suspended in 200 milliliters of 90 per cent ethylene glycol and sulfur dioxide passed therethrough over a period of 20 hours and at 100° C. Following completion of the reaction, the mixture was diluted with an excess of water and filtered. The filtration residue was washed with water and dried to obtain a 94 per cent yield of pentachlorophenol as a light yellow, crystalline product melting at approximately 182° C.

Example 5

In a like manner, hexachlorophenol was reduced with sulfur dioxide in the presence of 90 per cent methyl alcohol. The reaction was carried out at a temperature of 65° C. and over a period of sixteen hours to obtain a high yield of pentachlorophenol in the form of white crystals melting at 186° C.

Example 6

Pentachlorophenol was also prepared by the reduction of an aqueous alcoholic suspension of hexachlorophenol with sodium sulfite in the presence of hydrochloric acid. This reaction was carried out by dispersing 37 grams of hexachlorophenol and 50 grams of sodium sulfite in 200 milliliters of 95 per cent ethyl alcohol. The mixture was warmed to a temperature of approximately 78° and an excess of concentrated hydrochloric acid added portion-wise thereto over a period of several hours. The mixture was then diluted with an excess of water and filtered, whereby there was obtained a 96 per cent yield of a white, crystalline pentachlorophenol melting at 187°–188° C.

We claim:

1. In a method for the preparation of pentachlorophenol, the step which consists of reducing hexachlorophenol with gaseous sulfur dioxide in the presence of a lower aliphatic alcohol as an inert solvent for the reactants.

2. A process for preparing pentachlorophenol which comprises the steps of dispersing hexachlorophenol in a lower aliphatic alcohol containing between 5 and 50 per cent by volume of water, contacting gaseous sulfur dioxide with the dispersion of hexachlorophenol at a temperature above 50° C., diluting the reacted mixture with water, and separating pentachlorophenol therefrom.

3. In a method for the preparation of pentachlorophenol, the steps which consist of dispersing hexachlorophenol in a lower aliphatic alcohol containing between 5 and 50 per cent by volume of water, contacting gaseous sulfur dioxide with the dispersion of hexachlorophenol at a temperature between 50° and 100° C., diluting the reacted mixture with water, and separating pentachlorophenol therefrom.

4. In a method for the preparation of pentachlorophenol, the steps which consist of dispersing hexachlorophenol in a lower aliphatic alcohol containing between 5 and 50 per cent by volume of water, contacting gaseous sulfur dioxide with the dispersion of hexachlorophenol at the reflux temperature of the reaction mixture, diluting the reacted mixture with water, and separating pentachlorophenol therefrom.

5. In a method for the preparation of pentachlorophenol, the step which consists of reducing a dispersion of hexachlorophenol in an ethyl alcohol-water mixture with gaseous sulfur dioxide.

6. A process for preparing pentachlorophenol, which comprises the steps of dispersing hexachlorophenol in ethyl alcohol containing between 5 and 50 per cent by volume of water, contacting gaseous sulfur dioxide with the dispersion of hexachlorophenol at reflux temperature, diluting the reacted mixture with water, and separating pentachlorophenol therefrom.

7. In a method for the preparation of pentachlorophenol, the steps which consist of dispersing hexachlorophenol in ethyl alcohol containing between 5 and 50 per cent by volume of water, contacting gaseous sulfur dioxide with the dispersion of hexachlorophenol at a temperature between 50° and 100° C., diluting the reacted mixture with water, and separating pentachlorophenol therefrom.

8. A process for preparing pentachlorophenol, which comprises the steps of dispersing hexachlorophenol in 95 per cent ethyl alcohol, contacting gaseous sulfur dioxide with the dispersion of hexachlorophenol at the reflux temperature thereof, diluting the reacted mixture with water, distilling the ethyl alcohol out of the mixture, and separating pentachlorophenol from the distillation residue.

EDGAR C. BRITTON.
FRANCIS N. ALQUIST.